C. Z. MILLER & R. H. KLICKMAN.
COMBINED SLED AND WHEELED VEHICLE.
APPLICATION FILED JAN. 19, 1916.
1,217,200.
Patented Feb. 27, 1917.
2 SHEETS—SHEET 2.
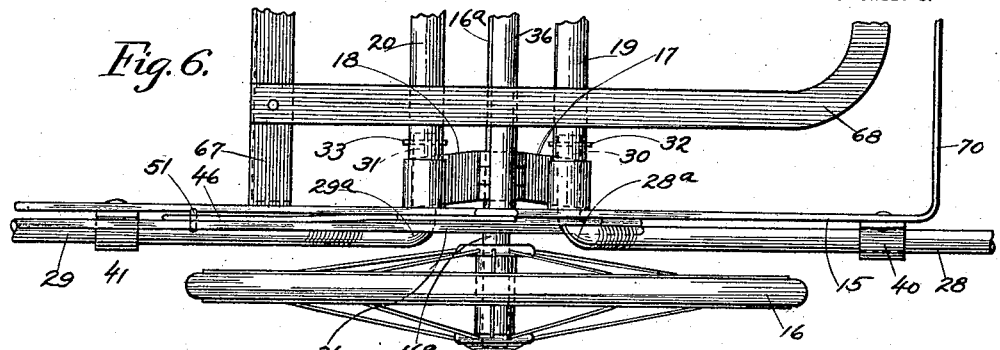
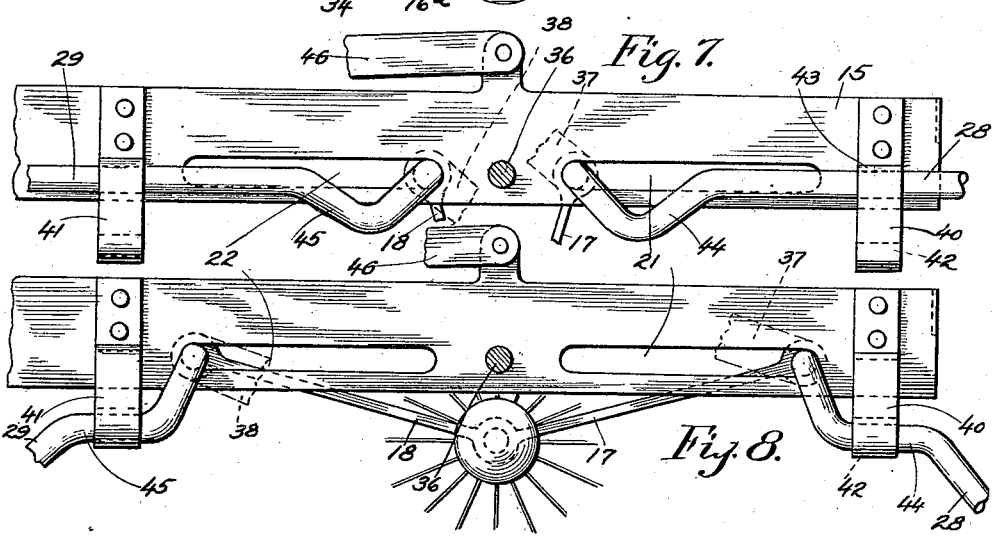
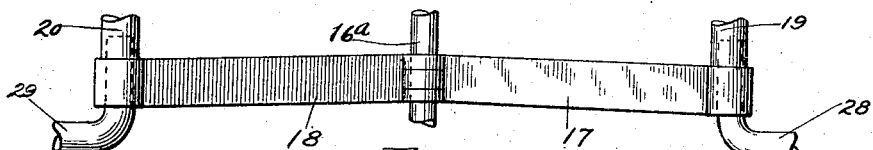
Witness:
CC Burnap
Inventors
Charles Z. Miller
Rudolph H. Klickman
By H H Kaufmann Atty.

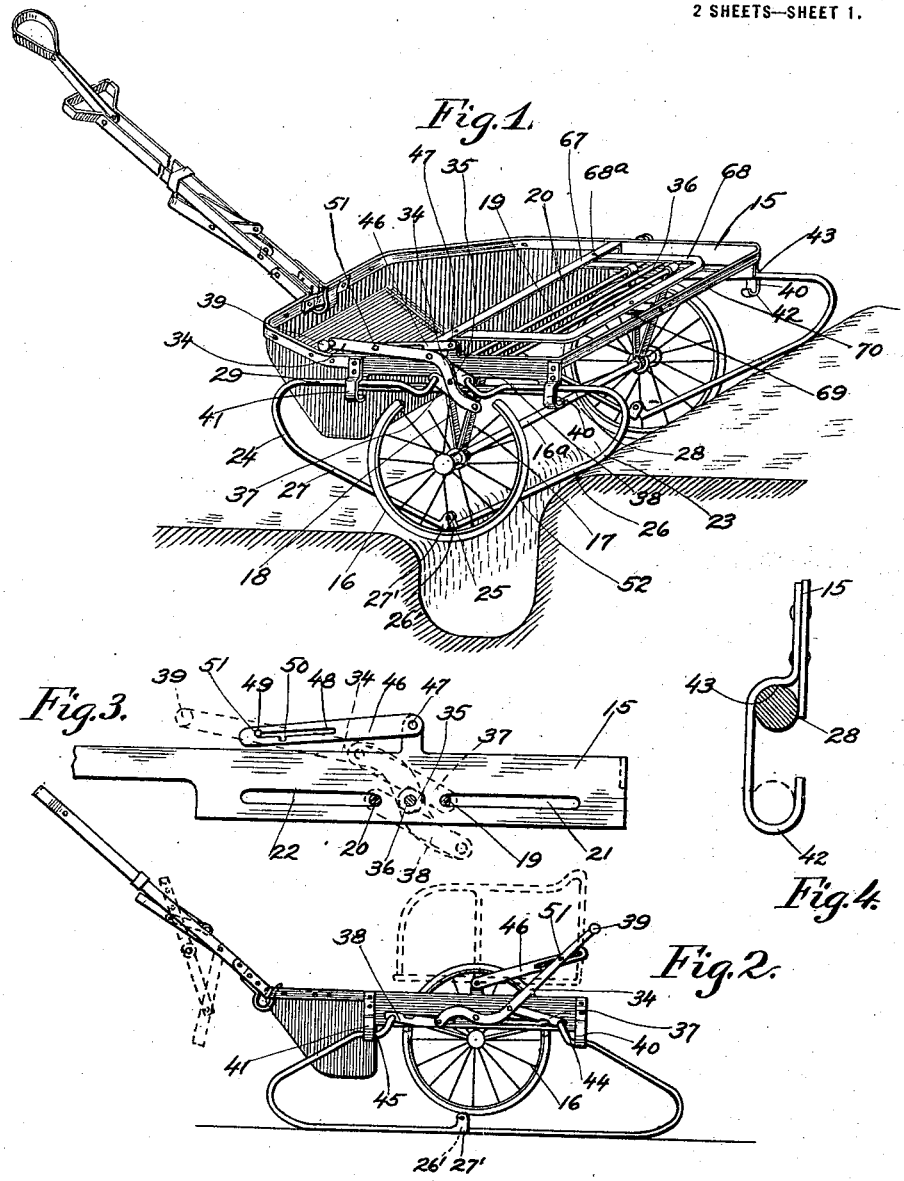

UNITED STATES PATENT OFFICE.

CHARLES Z. MILLER AND RUDOLPH H. KLICKMAN, OF CHICAGO, ILLINOIS.

COMBINED SLED AND WHEELED VEHICLE.

1,217,200.         Specification of Letters Patent.         Patented Feb. 27, 1917.

Application filed January 19, 1916. Serial No. 73,072.

*To all whom it may concern:*

Be it known that we, CHARLES Z. MILLER and RUDOLPH H. KLICKMAN, citizens of the United States, and both residing at No. 3549 North Halsted street, in the city of Chicago, in the county of Cook and State of Illinois, have invented a new and useful Improvement in a Combined Sled and Wheeled Vehicle, of which the following is a specification.

Our invention relates to infants' vehicles and has for its object the provision of a device which may be quickly converted from a wheeled vehicle into a sled and back again with the minimum of effort. Another feature of our device is the means by which the vehicle when in its wheeled form, may be made to more easily pass over obstructions than vehicles now in common use. The vehicle may be left standing without danger of accidentally moving on its wheels, by throwing the sled runners into supporting position.

Our invention comprises adjustable wheels and sled runners either of which may be quickly placed in operative position by the simple movement of a lever. The runners also have the additional function of skids or guards which assist the wheels in mounting an obstruction. The runners are divided into halves which are pivotally attached to each other, the halves being placed in a sloping position when the device is being used as a wheeled vehicle. They then pass the rims of the wheels at a point below the level of the center thereof. By this means an obstruction may slide along the runners which would then act as skids and meet the wheels at such an angle that said wheels can roll upon the obstructions without serious shock. The upper portion of the skids will first slide upon the obstruction and produce a considerable elevating effect after which the wheels will roll gently upon it.

Improvements in the frame and other features of our invention will become apparent in the following specification when taken in connection with the accompanying drawings.

Figure 1 is a perspective view of the vehicle with the wheels adjusted to support the same and with the runners in position to serve as skids;

Fig. 2 is a side elevation of the vehicle with the wheels elevated and the runners in their supporting positions;

Fig. 3 is a detail showing a portion of the frame and locking device for the handle which operates the wheels and runners;

Fig. 4 is a detail of the hooks or stops which rigidly brace the upper portions of the runners;

Fig. 5 is a plan view of the links connecting the wheel axle with the slidable portions of the runners;

Fig. 6 is a plan view of one side portion of the machine;

Fig. 7 is a side elevation of a detail of the frame and guide slots therein for the upper portions of the runners;

Fig. 8 is a side elevation of the same with the runners in different positions.

As seen more particularly in Figs. 1 and 2, the machine is provided with a frame 15 beneath which are placed wheels 16 at the lateral sides thereof. The axles $16^a$ on which said wheels are mounted are pivotally attached to the lower ends of inclined movable links 17 and 18, which are pivotally attached at their upper ends to sliding bars 19 and 20.

The outer ends of the bars 19 and 20 are secured by the two halves 23—24, respectively, of the runners, whose ends slide in the slots 21 and 22 in the frame 15. These parts are pivotally attached to each other at 25 and are provided with straight portions 26 and 27 which join with other straight portions 28 and 29. These straight portions have a certain angular relation to each other, as shown in the drawings, and are given a curved form at the angles. The pivotal connection at 25 permits the lower straight portions 26 and 27 to have inclined positions and serve as skids when elevated, as shown in Fig. 1 and when thus serving as skids they act as auxiliaries to the wheels in passing over obstructions, as will be more fully explained later.

The straight portions 26 and 27 may also be placed in alinement, as shown in Fig. 2. In this position they act as runners for the vehicle. The shoulders 26'—27' prevent bending beyond the positions of alinement. The upper and innermost ends of these runners slide in the slots 21 and 22 in the frame and are moved inwardly and outwardly or caused to approach and recede from each other by a lever 34 which is pivotally supported at 35 in the main frame. Links 37 and 38 connect the opposite arms of the said lever with the ends of the runners and serve to transmit the motion of said lever to said runners. A transverse bar 36 is rigidly secured to the lever 34 and transmits its motion to a corresponding lever on the opposite side of the machine. A handle 39 is provided at the end of the lever 34 at one side only of the machine.

The inner ends of the runners are bent inwardly, as shown at 28$^a$ and 29$^a$, and are inserted in sockets in the ends of the cross bars 19 and 20, as shown at 30 and 31, and are secured thereto by the pins 32 and 33.

The upper straight portions 28 and 29 of the runners are held in rigid relation to the frame by brackets or hooks 40 in either of the adjusted positions of said runners. When in the upper position each runner bears against the shoulder 43 of one of said braces, and is confined between the body of the brace and the frame, as shown more particularly in Fig. 4. In the lower position of said runners the upper part thereof bears against the hollow portion 42 of the hook. A portion 44 of the upper part of the runner is bent into such shape that it will lie flatly or horizontally in the hook, as shown in Figs. 2 and 8. The parts are locked in either of the positions described by the slotted link 46 which is pivoted at 47 to the main frame. At 49 and 50 in said slot are offsets or notches which engage a pin 51 in the lever 34, one of said notches engaging the pin in one extremity of the movement and the other notch engaging it in the opposite extremity. These notches are so located in the slot as to hold the parts snugly in their adjusted positions. This slotted link follows the lever from one position to the other and drops by gravity into locking position with one or the other of the notches in engagement with the pin 51. It will be noted that the notches are at opposite sides of the slot and that gravity will cause either one or the other to engage the pin, depending upon which side of the center the lever is adjusted to.

Running transversely of the frame is a flexible supporting element 67 to which the seat may be attached. Extending rearwardly from this piece is the looped flexible element 68 which is supported at its center by the connecting piece 69 which is attached to the rear portion 70 of the main frame. The forward extremities of the loop are attached at 68$^a$ to the cross piece 67. It will be seen that the loop 68 is suspended at three points and that a yieldable support for the seat is thus provided. Considerable spring effect is provided for the seat by this means.

In the use and operation of our improved vehicle it will be seen that when it is in the form of a wheeled vehicle, the skids or guards 26, 27 would first strike an obstruction. They may be made to engage an unusually high obstruction by tilting the vehicle by means of the handle. The slope of the skids causes them to slide easily upon the obstruction after which the wheels meet it at a point which is well below their centers, thereby allowing them to roll gently upon it. The angle at the intersection of the skid and the rim of the wheel is quite obtuse and no serious shock will be caused when the wheel reaches the obstruction. For like reasons the wheels and skids will leave the obstruction on the other side with the minimum of jarring.

When it is desired to convert the vehicle into a sled, it is necessary only to reverse the position of the lever 34, which by means of the links 37, 38, will push the inner extermities of the runners apart and cause the lower portions 26, 27 to assume positions of alinement. Simultaneously therewith the links 17, 18 raise the wheels from the ground. The link 46 with its notches falls into engagement with the pin 51 and locks the lever and hence the runners in position. A reverse movement will as quickly restore the wheeled form.

If it is desired to leave the vehicle in a stationary position the runners may be lowered.

By means of our improvements it will be seen that we have produced a vehicle which can be converted into either a sled or a wheeled vehicle instantly and with the minimum of effort, that will mount and pass over obstructions with greater facility than vehicles now known and with the minimum of jarring, and that in other respects it is very convenient in use.

It will be obvious that while we have shown and described our invention with more or less particularity, we do not wish to be restricted to the form shown and described, beyond the scope of the appended claims.

What we claim is:

1. In a combined sleigh and wheeled vehicle, a supporting element adjustable to a horizontal position to serve as a runner, and also adjustable to a sloping position to serve as a skid.

2. In a combined sleigh and wheeled vehicle, a supporting element adjustable to a horizontal position to serve as a runner, and also adjustable to a sloping position to serve as a skid, and a wheel movable into and out of supporting position.

3. In a combined sleigh and wheeled vehicle, a supporting element adjustable to a horizontal position to serve as a runner, and also adjustable to a sloping position to serve as a skid, and a wheel movable into and out of supporting position, either said wheel or said runner being movable into supporting position at the will of the operator.

4. In a combined sleigh and wheeled vehicle, a supporting element adjustable to a horizontal position to serve as a runner, and also adjustable to a sloping position to serve as a skid, and a wheel movable into and out of supporting position, said runner and said wheel being simultaneously movable, one being moved into supporting position while the other is moved out of said position.

5. In a combined sleigh and wheeled vehicle, a supporting element adjustable to a horizontal position to serve as a runner, and also adjustable to a sloping position to serve as a skid, a wheel movable into and out of supporting position, said runner and said wheel being simultaneously movable, one being moved into supporting position while the other is moved out of said position, a frame, and means attached to said frame for thus moving said runner and said wheel.

6. In a combined sleigh and wheeled vehicle, a supporting element adjustable to a horizontal position to serve as a runner, and also adjustable to a sloping position to serve as a skid, a wheel movable into and out of supporting position, said runner and said wheel being simultaneously movable, one being moved into supporting position while the other is moved out of said position, a frame, means attached to said frame for thus moving said runner and said wheel, and means for locking said runner and said wheel in said positions.

7. In a combined sleigh and wheeled vehicle, a supporting element adjustable to a position to serve as a runner, and also adjustable to a position to serve as a skid, a wheel movable into and out of supporting position, said runner and said wheel being simultaneously movable, one being moved into supporting position, while the other is moved out of said position, a frame, means attached to said frame for thus moving said runner and said wheel, means for locking said runner and said wheel in said positions, and means for engaging portions of said runners adjacent said frame and holding them in rigid relation thereto.

8. In a combined sleigh and wheeled vehicle, a frame, a runner composed of two parts pivoted to each other intermediate the ends of said runner, said ends being movably attached to said frame, said ends being constrained to approaching and receding movements with relation to each other, thereby causing the halves of said runner to assume either positions of alinement to serve as a runner, or angular positions to serve as skids.

9. In a combined sleigh and wheeled vehicle, a frame, a runner composed of two parts pivoted to each other intermediate the ends of said runner, said ends being movably attached to said frame, said ends being constrained to approaching and receding movements with relation to each other, thereby causing the halves of said runner to assume either positions of alinement to serve as a runner, or angular positions to serve as skids, a wheel, and means connecting said wheel with the ends of said runner to elevate said wheel when said ends recede from each other, and to lower said wheel when said ends approach each other.

10. In a combined sleigh and wheeled vehicle, a frame, a runner composed of two parts pivoted to each other intermediate the ends of said runner, said ends being movably attached to said frame, said ends being constrained to approaching and receding movements with relation to each other, thereby causing the halves of said runner to assume either position of alinement to serve as a runner, or angular positions to serve as skids, a wheel, means connecting said wheel with the ends of said runner to elevate said wheel when said ends recede from each other and to lower said wheel when said ends approach each other, and means carried by said frame for effecting said approaching and receding movements at the will of the operator.

11. In a combined sleigh and wheeled vehicle, a frame, a runner composed of two parts pivoted to each other intermediate the ends of said runner, said ends being movably attached to said frame, said ends being constrained to approaching and receding movements with relation to each other, thereby causing the halves of said runner to assume either position of alinement to serve as a runner, or angular positions to serve as skids, a wheel, means connecting said wheel with the ends of said runner to elevate said wheel when said ends recede from each other and to lower said wheel when said ends approach each other, means carried by said frame for effecting said approaching and receding movements at the will of the operator, and means carried by said frame for locking the last named means in either extremity of its movement.

12. In a combined sleigh and wheeled vehicle, a frame, a runner composed of two parts pivoted to each other intermediate the ends of said runner, said ends being movably attached to said frame, said ends being constrained to approaching and receding movements with relation to each other, thereby causing the halves of said runner to assume either position of alinement to serve as a runner, or angular positions to serve as skids, a wheel, means connecting said wheel with the ends of said runner to elevate said wheel when said ends recede from each other and to lower said wheel when said ends approach each other, means carried by said frame for effecting said approaching and receding movements at the will of the operator, means carried by said frame for locking the last named means in either extremity of its movement, and means carried by said frame for engaging the end portions of said runner at either extremity of their movements and thereby hold them in rigid relation to said frame.

13. In a combined sleigh and wheeled vehicle, a frame, runners at opposite sides thereof movable into and out of either horizontal supporting positions to serve as runners, or sloping positions to serve as skids, means at each side of said frame for operating the respective runner on that side, and means rigidly connecting said operating means to each other.

14. In a combined sleigh and wheeled vehicle, a frame, runners at opposite sides thereof movable into and out of either horizontal supporting positions to serve as runners, or sloping positions to serve as skids, means at each side of said frame for operating the respective runner on that side, means rigidly connecting said operating means to each other, and wheels at opposite sides of said frame movable into and out of supporting positions simultaneously with the movements of opposite character of said runners.

15. In a combined sleigh and wheeled vehicle, a frame, runners at opposite sides thereof movable into and out of either horizontal supporting positions to serve as runners, or sloping positions to serve as skids, means at each side of said frame for operating the respective runner on that side, means rigidly connecting said operating means to each other, wheels at opposite sides of said frame movable into and out of supporting positions simultaneously with the movements of opposite character of said runners, and means for locking both said operating means in either extremity of their movements.

16. In a vehicle, a wheel, and a skid having a sloping straight portion adjacent said wheel, making an obtuse angle with the rim thereof at a point below the level of the center thereof, thereby allowing said wheel to easily engage an obstruction after said skid has first become engaged therewith, and a second skid of like form on the opposite side of said wheel to receive the weight from said wheel.

17. In a vehicle, a wheel, and a skid having a sloping straight portion adjacent said wheel, making an obtuse angle with the rim thereof at a point below the level of the center thereof, and sloping upwardly from said rim at an acute angle with the ground, thereby allowing said wheel to easily engage an obstruction after said skid has first become engaged therewith, and a second skid of like form on the opposite side of said wheel to receive the weight from said wheel.

18. In a vehicle, a wheel, a skid adjacent said wheel, making an obtuse angle with the rim thereof at a point below the level of the center thereof, thereby allowing said wheel to easily engage an obstruction after said skid has first become engaged therewith, and a second skid of like form on the opposite side of said wheel and pivotally attached to said first named skid.

19. In a vehicle, a wheel, a skid adjacent said wheel, making an obtuse angle with the rim thereof at a point below the level of the center thereof, thereby allowing said wheel to easily engage an obstruction after said skid has first become engaged therewith, and a second skid of like form on the opposite side of said wheel and pivotally attached to said first named skid; said skids being adjustable into positions of alinement, thereby forming a runner for said vehicle.

20. In a vehicle, a wheel, a skid adjacent said wheel, making an obtuse angle with the rim thereof at a point below the level of the center thereof, thereby allowing said wheel to easily engage an obstruction after said skid has first become engaged therewith, and a second skid of like form on the opposite side of said wheel and pivotally attached to said first named skid; said skids being adjustable into positions of alinement, thereby forming a runner for said vehicle; said skids having shoulders adjacent their pivotal connection which prevent movement beyond said positions of alinement.

21. In a vehicle, a wheel, and a skid having a straight portion adjacent said wheel, making an obtuse angle with the rim thereof at a point below the level of the center thereof, and making an acute angle with the ground thereby allowing said wheel to easily engage an obstruction after said skid has first become engaged therewith; said wheel being adjustable to a position entirely above the level of said skid.

22. In a vehicle, a wheel, and a skid having a straight portion adjacent said wheel, making an obtuse angle with the rim thereof at a point below the level of the center thereof, thereby allowing said wheel to easily engage an obstruction after said skid has first become engaged therewith; said straight portion of said skid sloping upwardly at an acute angle with the ground and being adjustable to a position parallel with the ground.

23. In a combined sleigh and wheeled vehicle, a supporting element adjustable to a position to serve as a runner, and also adjustable to a position to serve as a skid, and means separate from its pivotal connection to said frame for engaging portions of said runner adjacent said frame and holding them in rigid relation thereto.

24. In a combined sleigh and wheeled vehicle, a supporting element comprising centrally pivoted portions, and means connecting the outer extremities of said portions for adjusting the angular relation thereof.

25. In a combined sleigh and wheeled vehicle, a supporting element comprising centrally pivoted portions, means connecting the outer extremities of said portions for adjusting the angular relation thereof, and a wheel movable into and out of supporting position by said connecting means.

CHARLES Z. MILLER.
RUDOLPH H. KLICKMAN.

Signed in the presence of—
 JOHN A. GARRETT,
 ALBERT B. DUNNING.

Copies of this patent may be obtained for five cents each, by addressing the "Commissioner of Patents, Washington, D. C."